July 10, 1934.  J. H. PEARSON  1,965,721
DEVICE FOR MARKING LENSES AND THE LIKE
Filed March 21, 1932
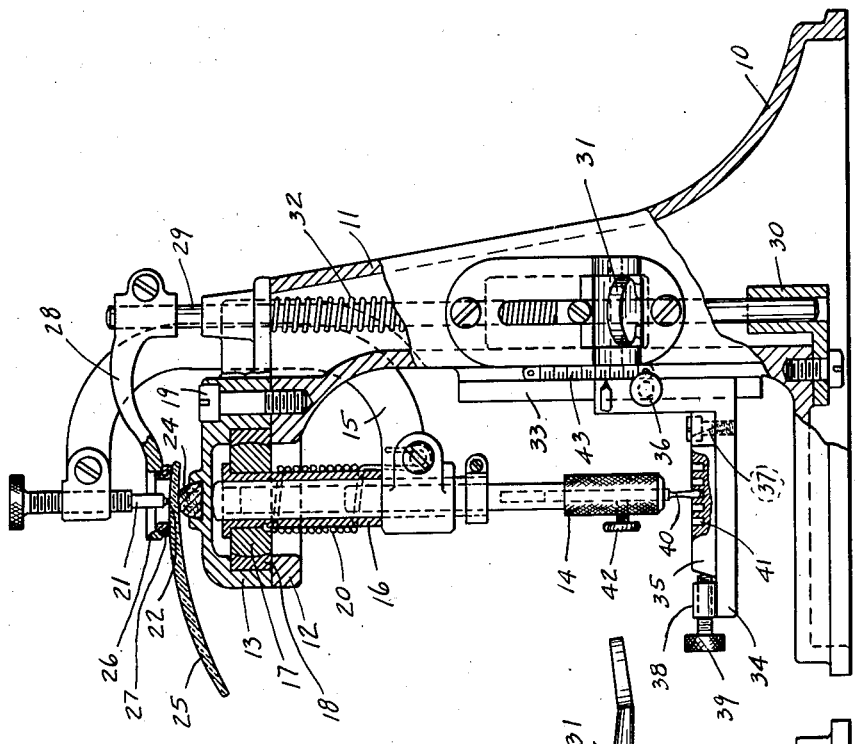
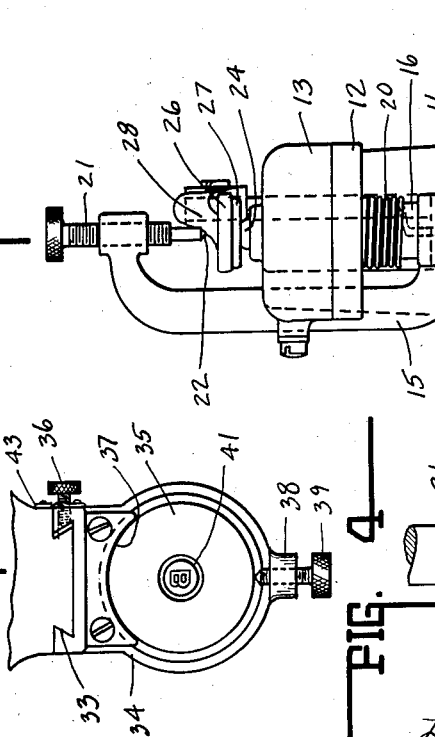
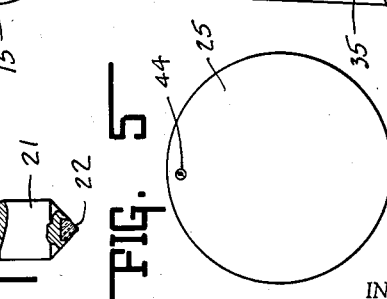
INVENTOR.
JOHN HARVEY PEARSON.
BY
Lockwood Lockwood Goldsmith & Gact
ATTORNEYS.

Patented July 10, 1934

1,965,721

UNITED STATES PATENT OFFICE 1,965,721

DEVICE FOR MARKING LENSES AND THE LIKE

John Harvey Pearson, Indianapolis, Ind., assignor to Continental Optical Manufacturing Company, Indianapolis, Ind., a corporation Application March 21, 1932, Serial No. 600,357

4 Claims. (Cl. 33—23)

This invention relates to a hand-manipulated device for applying a distinguishing mark to surfaces, and particularly lenses employed for eyeglasses or other optical purposes.

In the optical trade, it has not been customary to in any manner mark eyeglasses or spectacle lenses for identification. This is principally due to the fact that to do so would mar the surface and disturb or destroy the vision. Consequently, producers of lenses, or opticians in finishing lenses are unable to identify them as being their product or finished by them, all of which in certain instances it at times embarrassing. Thus, after the lens is mounted in a spectacle frame, it loses its identity. Therefore, in event of a faulty lens or poor prescription, the optician cannot determine whether it is the lens which he provided or some substitute lens. The above is merely one example of the advantages and desirability in marking the lens for identification and to indicate its source of origin in accordance with the usual trade-mark practices.

The principal object of this invention is to provide a simple hand-manipulated tool which may be employed by the optician to mark a trademark or symbol upon the surface of a finished optical lens in such manner as not to disturb the optical properties and vision, while at the same time permitting of ready identification.

Another feature of the invention resides in the mounting of the stone-holding and manipulating tool so as to be freely moving, but non-rotatable, said tool being extensible for varying the size of the marking, within limits, and being subject to variable spring pressure for accommodating different thicknesses of lenses and depth of burnishing.

Another feature of the invention resides in the holding device for the lens which permits of immediate and ready application of the tool.

A further feature resides in the locking means for the stencil or die and its vertical adjustability to accommodate it to varying lengths of the marking tool to effect varying sizes of markings on the lens.

Other features and advantages of the device will be apparent as hereinafter more specifically pointed out and claimed, it being observed that objects other than lenses may be similarly marked, lenses being specifically referred to herein as disclosing one application of the invention.

The full nature of the invention will be understood from the accompanying drawing and the following description and claims.

In the drawing, Figure 1 is a central vertical section of the device shown in normal position. Fig. 2 is a side elevation of the device with a lens held therein in position to be marked, with parts shown in cross section. Fig. 3 is a plan view of the die and holding platform. Fig. 4 is an enlarged section through the stone-holding member. Fig. 5 is a view of a lens showing the finished marking thereon.

In the drawing there is shown a marking device, particularly adapted for marking spectacle lenses or eyeglasses, comprising a supporting base 10 from which arises a standard 11 formed integrally therewith. Said standard is provided with a forwardly-extending integral supporting member 12 upon which is removably secured a cap 13. A marking tool is supported upon the supporting member 12 and secured by the cap 13 so as to have universal movement, said tool comprising a rod 14 to which is rigidly secured a bowed section 15. The upper portion of the rod 14 is surrounded by a sleeve 16 in which it is slidably mounted, said sleeve having secured to the upper end thereof a head 17 supported for universal movement within a bearing member 18, said bearing member being clamped between the supporting member 12 and cap 13 by the screws 19. A spiral spring 20 surrounds the sleeve 16, being secured at its upper end to the head 17 and at its lower end to the bowed section 15, whereby said spring 20 will normally maintain the rod 14 in its uppermost position. The bowed section 15 is provided with an adjustable finger 21 in the form of a thumb screw, a burnishing stone or diamond 22 being mounted in the lower end thereof.

Carried upon the cap 13 is a supporting cushion 24 of rubber or the like upon which a lens 25 is adapted to rest in position to be marked. Said lens is held in position upon the cushion 24 by a movable clamp 26 carrying a pad 27. The clamp 26 is in the form of a ring through which the finger 21 extends for engagement with the lens. Said clamp 26 is formed on a neck 28 which is adjustably mounted upon a rod 29, said rod extending downwardly through suitable bearings in the standard 11, its lower end being slidably mounted in a bearing 30. Pivotally mounted upon the side of the standard there is a lever 31 adapted to engage the rod 29 for elevating it against the tension of a spring 32 surrounding said rod, said spring tending to normally hold the clamp in its downward clamping position. Thus, upon pressing the lever 31 downwardly, the clamp is elevated against the tension of the spring 32 to receive the lens, whereas upon the lever being released, said spring forces the clamp downwardly into clamping position.

Slidably mounted upon the standard through the medium of a keyway 33 there is a vertically-adjustable platform 34 adapted to carry a die block 35. Said platform is adjustable vertically within limits and secured in adjusted position by a thumb screw 36. The platform is provided with a curved shoulder 37 and a diametrically-opposed boss 38, between which the die 35 may be seated. A thumb screw 39 extends through the boss 38 into clamping engagement with the die block for holding it firmly in position. Slidably mounted in the rod 14, so as to be extensible relative thereto, there is a stylus 40 adapted to extend into the recesses 41 in the die block, said recesses forming the outline of the mark to be produced on the lens. Said stylus is secured in adjusted position by a thumb screw 42. A scale plate 43 may be secured to the side of the standard to indicate the comparative size of the mark 44 to be made upon the lens, depending upon the vertical adjustment of the platform 34. Thus, when the platform is lowered so that the distance between the die and the lens has increased, the size of the mark 44 will be less than when the platform is raised. Thus, it will be observed that the die may be rotated or adjusted to a position wherein the marking upon the lens may be arranged as desired without changing the position of the lens in the holder.

In operation, the platform is adjusted to its proper height to obtain the desired size of marking. Thereupon the die having the desired marking is mounted upon the platform 34. The lever 31 is pushed down to raise the clamp 26, the lens inserted, and the lever released so that the lens will be clamped in position to receive the diamond point 23 at the proper location on its surface. The operator then grasps the rod 14 at the knurled portion thereof, and pulls down thereon against the tension of the spring 20 so that the diamond point bears upon the surface of the lens. The grooves 41 in the die are then followed by moving the stylus 40 thereabout, whereupon the rod 14 is released, the lever 31 depressed, and the lens removed. The lens will then bear upon its surface a well-defined mark having an outline in accordance with that of the grooves in the die, but appreciably smaller.

By means of this device, the marking on the lens may be quickly and conveniently made, and will be clear and distinct so that the outline of the marking may be readily discerned as a distinctive mark or trade-mark. But on the other hand, the mark will be so light and small that it will not interfere with the vision or be perceptible unless the lens is closely examined.

While the invention has been described as pertaining particularly to the marking of a spectacle lens or eyeglass, such description is only by way of an example since other articles may be marked in the same manner.

The invention claimed is:

1. A device for marking lenses and the like, comprising a supporting standard, a lens support thereon, a clamping ring for engaging and clamping the lens upon said support, a spring for holding said ring in clamping position under spring tension, means for releasing the same to permit insertion or withdrawal of the lens, and a marking tool adapted to extend through said clamping ring for engaging and marking said lens while held in clamped position.

2. A device for marking lenses and the like, comprising a supporting standard adapted to receive a lens thereon, means for clamping the lens in place, a die member, an adjustable platform for supporting said member, a tool adapted to engage the surface of the lens for marking the same, and means on said tool adjustable to the position of the die member and platform for causing said tool to mark the lens in accordance with the mark outlined on said die, the corresponding size of said marking depending upon the position of the die-supporting platform.

3. A device for marking lenses and the like, comprising a standard having a supporting member extending forwardly therefrom, a sleeve suspended therefrom on a universal mounting, a marking tool slidably mounted in said sleeve, said tool including a bowed portion passing about said supporting member, a lens engaging point on the upper end thereof and an extended stylus on the lower end thereof, a spring for normally maintaining said tool in its non-operating position, an annular clamping member for engaging said lens and securing it on said supporting member under spring tension, and a die having a mark grooved therein, said die being so positioned as to permit said tool to be lowered into lens-engaging position with the stylus in said groove and manipulated to transmit movement in accordance with the groove in the die to the lens engaging point for marking the outline of the groove on said lens.

4. A device for marking lenses and the like, comprising a standard having a supporting member extending forwardly therefrom, a sleeve suspended therefrom on a universal mounting, a marking tool slidably mounted in said sleeve, said tool including a bowed portion passing about said supporting member, a lens engaging point on the upper end thereof and an extended stylus on the lower end thereof, a spring for normally maintaining said tool in its non-operating position, an annular clamping member for engaging said lens and securing it on said supporting member under spring tension, a die having a mark grooved therein, said die being so positioned as to permit said tool to be lowered into lens-engaging position with the stylus in said groove and manipulated to transmit movement in accordance with the groove in the die to the lens engaging point for marking the outline of the groove on said lens, and means for adjusting the relative positions of the die and tool with respect to said universal mounting to vary the size of the mark imparted to the lens.

JOHN HARVEY PEARSON.